United States Patent [19]

Perry

[11] Patent Number: 4,514,844
[45] Date of Patent: Apr. 30, 1985

[54] DUPLEX DIGITAL SPAN TRANSMISSION CIRCUIT ARRANGEMENT

[75] Inventor: Thomas J. Perry, Phoenix, Ariz.

[73] Assignee: GTE Automatic Electric Inc., Northlake, Ill.

[21] Appl. No.: 506,561

[22] Filed: Jun. 22, 1983

[51] Int. Cl.³ .................... G06F 11/20; H04B 3/46
[52] U.S. Cl. .................... 371/8; 340/825.01; 370/16
[58] Field of Search ............... 371/8; 370/16; 340/825.01; 179/18 EE

[56] References Cited

U.S. PATENT DOCUMENTS

| | | | |
|---|---|---|---|
| 4,365,247 | 12/1982 | Bargeton et al. | 340/825.01 |
| 4,365,248 | 12/1982 | Bargeton et al. | 340/825.01 |
| 4,393,493 | 7/1983 | Edwards | 370/16 |
| 4,395,772 | 7/1983 | Trested, Jr. | 340/825.01 X |
| 4,413,335 | 11/1983 | Clements et al. | 370/16 |
| 4,442,518 | 4/1984 | Morimoto | 371/8 |
| 4,455,645 | 6/1984 | Mijioka et al. | 370/16 |

Primary Examiner—Charles E. Atkinson
Attorney, Agent, or Firm—Frank J. Bogacz; Peter Xiarhos

[57] ABSTRACT

In a telecommunications switching system, a thick film digital span circuit arrangement is connected between a digital span and a switching network of the switching system. The transmission circuit arrangement converts unipolar switching network data to bipolar data for use by the digital span. The telecommunications switching system provides for duplicated data transmission to the digital span. Duplicated transmission circuits are arranged in an active/standby configuration under CPU control without affecting the overall impedance seen by the digital span.

12 Claims, 4 Drawing Figures

DUPLEX DIGITAL SPAN TRANSMISSION CIRCUIT ARRANGEMENT

BACKGROUND OF THE INVENTION

The present invention pertains to digital span data transmission circuitry and more particularly to a fault tolerant transmission circuit arrangement for use with a switching network in a CPU controlled telecommunications switching system.

Typically, circuits for transmitting unipolar switching network data to bipolar data compatible with use by modern digital span equipment is implemented using discrete components. These circuits are large in size and consume a relatively large amount of power.

Public policy requires that a telecommunications switching system provide virtually uninterrupted service to the public over long periods of time. Simple solutions to this problem include mere duplication of circuitry. Given the background of the present technology as being discrete components, as mentioned above, duplication of circuitry will lead to more size requirements and power consumption.

Accordingly, it is the object of the present invention to provide a fault tolerant transmission circuit arrangement, which is small in size and requires a small amount of power, for translating unipolar switching network data to data compatible with a digital span of a telecommunications switching system.

SUMMARY OF THE INVENTION

In a telecommunications switching system which has a CPU, a transmission circuit arrangement is connected between a digital span and a switching network of the switching system. The transmission circuit arrangement provides a fault tolerant method for converting unipolar switching network data to bipolar digital span data.

The transmission circuit arrangement includes first and second transmission circuit copies. In addition, first and second corresponding transformers are respectively connected between the first and second transmission circuit copies and the digital span. Each transmission circuit copy is respectively connected to the transformer by first and second output leads. The switching network is connected to each transmission circuit copy via corresponding first and second input leads. The switching network operates to alternately transmit first and second input signals of a first value via these leads to each transmission circuit copy.

Each transmission circuit copy has a first current controller which is connected to the first input lead and to the first and second output leads. The first current controller operates to connect the first input lead to the second output lead. The first current controller also operates to permit a predetermined current flow from the first to the second output lead via the corresponding transformer.

Each transmission circuit copy also includes a second current controller which is connected to the second input lead and to the first and second output leads. The second current controller operates to connect the second input lead to the first output lead. The second current controller also operates to permit a predetermined current flow from the first to the second output lead via the corresponding transformer.

Each transmission circuit copy also includes a voltage controller which is connected to the CPU, to a voltage source, and to the first and second current controllers. The voltage controller operates in response to the CPU to enable the first transmission circuit copy while simultaneously disabling the second transmission circuit copy. The voltage controller alternatively operates in response to the CPU to disable the first transmission circuit copy and simultaneously to enable the second transmission circuit copy.

Lastly, each transmission circuit copy includes an impedance controller which is connected to the CPU, to the corresponding transformer via a terminal lead and to the voltage controller. The impedance controller operates in response to the CPU to connect a high impedance to the terminal lead in order to disable the corresponding transmission circuit copy or alternatively the impedance controller operates in response to the CPU to connect a low impedance to the terminal lead to enable the corresponding transmission circuit copy.

The first and second current controllers of each transmission circuit copy are alternately operated to produce the required bipolar data for the digital span.

DESCRIPTION OF THE PREFERRED EMBODIMENT

Figure 1:
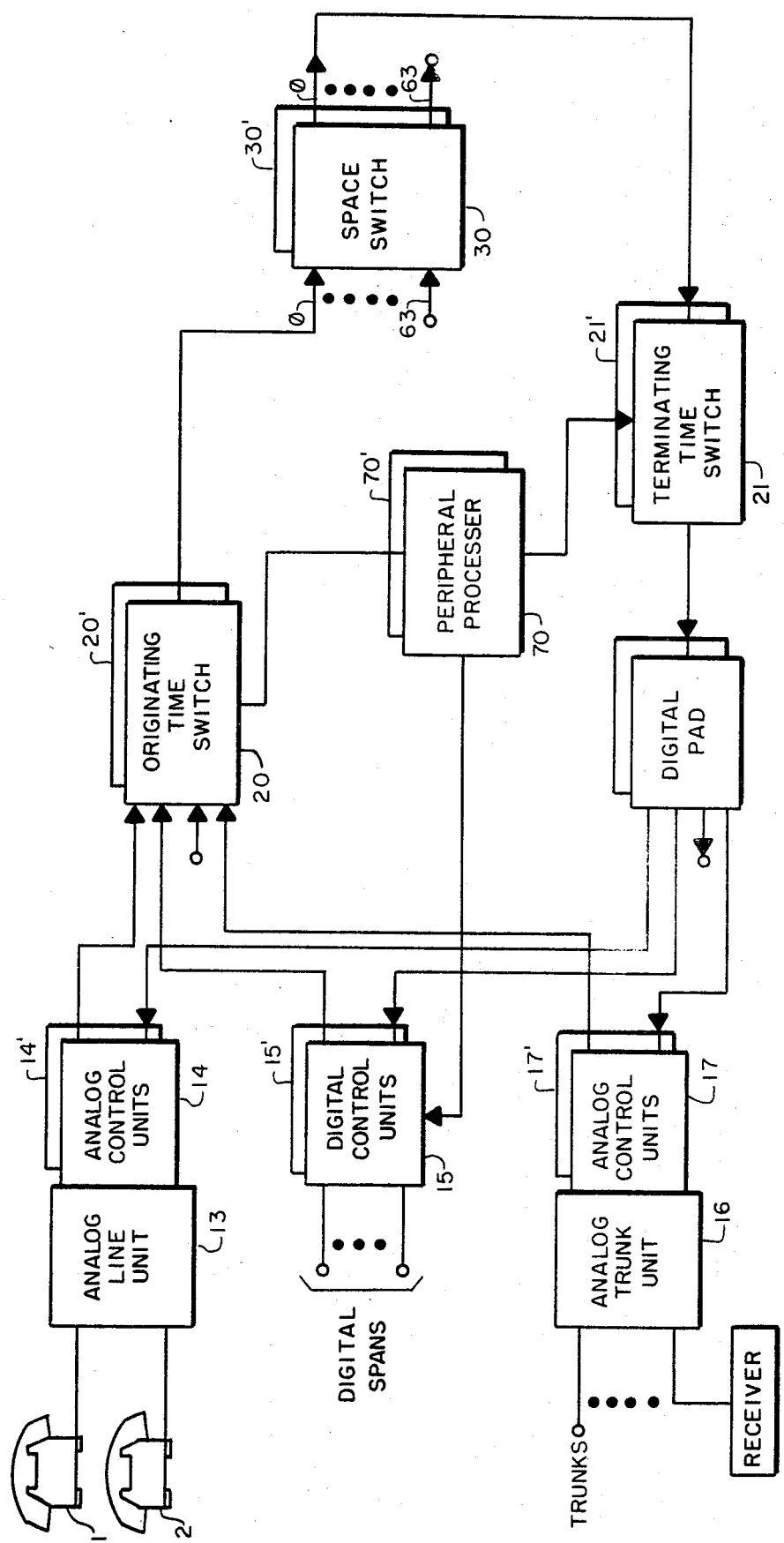
FIG. 1 is a block diagram of a telecommunications switching system embodying the present invention.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turn connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using a model 9004 T1 digital span manufactured by GTE Lenkurt Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Figure 2:
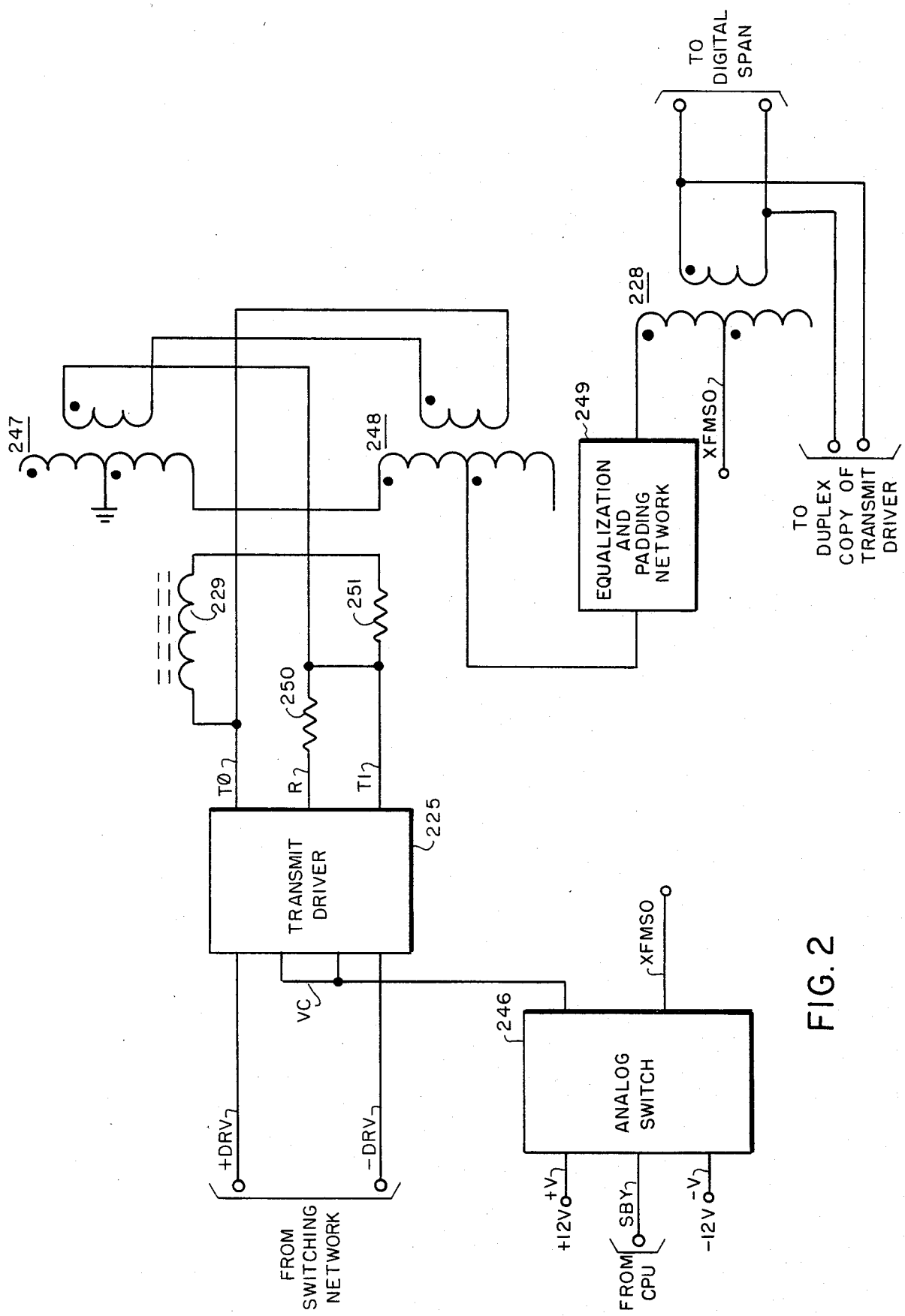
FIG. 2 is a block diagram of the transmission circuit of the present invention shown for simplex or duplex operation.

Referring to FIG. 2, a transmit driver along with an analog switch and an equalization and padding network is shown. It is to be noted that although FIG. 2 depicts a single copy of each of the above mentioned devices, there may be duplex copies, copy 0 and copy 1, located in digital control units (DCUs) 15 and 15', respectively. These transmission circuit copies provide a duplex link between the switching network and each digital span.

Transmit driver 225 is connected to the switching network via the +DRV and D—DRV leads. These leads are driven by open collector peripheral drivers capable of handling 300 MA of current. Alternate logic ones appear on the +DRV and −DRV leads, connected to transmit driver 225.

Transmit driver 225 converts the unipolar signals of the switching network to bipolar signals required by the digital span. Transmit drive 225 is connected to an inductive-resistive network made up of inductor 229, resistor 250, resistor 251, and transformers 247 and 248. The output of this inductive-resistive network provides overshoot and undershoot on the rising and falling edges of the pulses from transmit driver 225. The voltage input to the inductive-resistive network is approximately 6 volts, whereas the pulses transmitted from the secondary winding of transformer 248 are approximately 12 volts.

A center tap connection of transformer 248 conducts the above mentioned output pulses to equalization and padding network 249. Equalization and padding network 249 provides an approximately 6 db attenuation for a 100 ohm load. This network provides for less attenuation at higher frequencies. The equalization and padding network 249 compensates for increased capacitive loading as cable distances between this circuit and the digital span cross-connect increase.

The output of equalization and padding network 249 is connected through transformer 228 to the digital span. For a simplex configuration, lead XFMS0 of transformer 228 would be connected directly to ground and the VC leads of transmit driver 225 would be connected directly to a voltage source. For the duplex configuration mentioned above, the XFMS0 lead of transformer 228 would be connected to analog switch 246. The VC lead of transmit driver 225 would also be connected to analog switch 246.

A peripheral processor (CPU) is connected to an analog switch 246 of each transmission circuit copy. The CPU operates the analog switches 246 of each copy, such that, one analog switch (and therefore transmission circuit) is active and operating and the other copy of the duplex pair is ready and standby. Analog switch 246 is connected to the CPU by the SBY lead. A logic 0 on the SBY lead indicates that the transmission circuit is in the operating and active state, whereas a logic 1 on the SBY lead indicates that it is in the ready and standby state. In the duplex configuration, analog switch 246 if enabled by the peripheral processor, produces a low impedance path to ground via the XFMS0 lead, which is connected to the center tap connection of transformer 248. For the condition in which this transmitter circuit is disabled, analog switch 246 provides a high impedance condition on the XFMS0 lead, which is connected to transformer 228, thereby disabling any transmission.

The transmit driver 225, the analog switch 246 and the equalization and padding network 249 may each comprise a thick film hybrid.

Figures 3, 4:
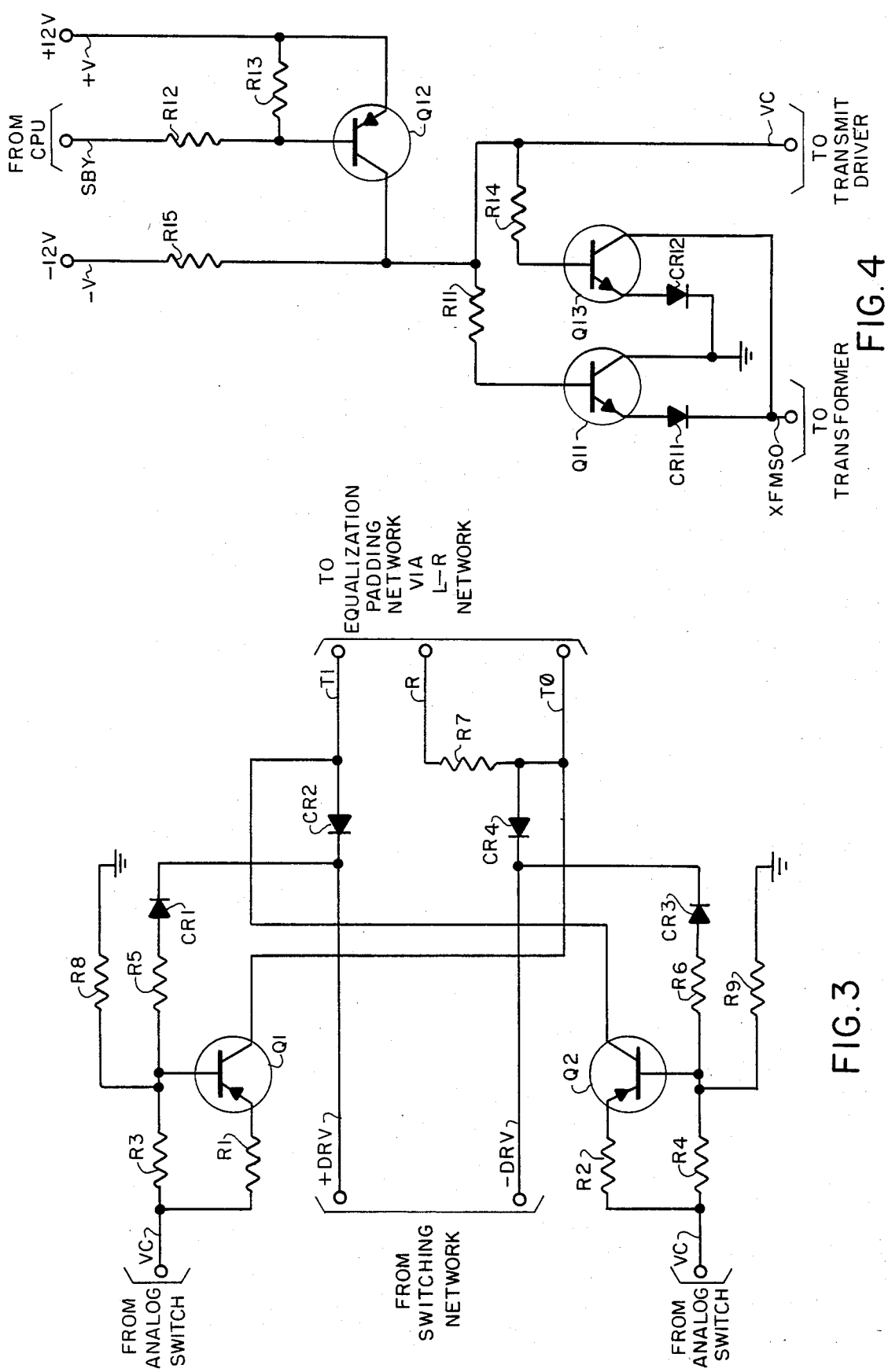
FIG. 3 is a schematic diagram of the transmit driver hybrid.
FIG. 4 is a schematic diagram of the analog switch hybrid.

Referring to FIG. 3, a schematic diagram of the transmit driver of FIG. 2 is shown. When neither input +DRV or −DRV is being driven with data transmission from the switching network, resistor R7 will provide a 100 ohm termination to transformer 228. This condition is required for a digital span line that is not transmitting data. This condition is a switching industry standard.

For the condition that this transmission circuit is enabled by the peripheral processor, the VC leads will be at +12 volts. If no data is being transmitted via the +DRV lead, no current will flow through diode CR1 or resistor R5. Therefore, 200 ohm resistor R3 will pull the base of transistor Q1 to approximately +12 volts. This will turn off Q1. Although Q1 will not completely turn off, the current flow through it will be greatly reduced.

Similarly, if no data is being transmitted via the −DRV lead, no current will flow through diode CR3 or resistor R6. Therefore, 200 ohm resistor R4 will pull the base of transistor Q2 to approximately +12 volts. Since little current will flow through transistor Q2, Q2 will be essentially turned off.

Next, if data is transmitted from the switching network via the +DRV lead, the +DRV lead will be pulled to ground by a pulse. As a result, the T1 lead, which is connected ultimately to output transformer 228, will be connected to ground on the +DRV lead via diode CR2. Transistor Q2 remains turned off. Also, current will flow through resistor R3, resistor R5 and diode CR1. Resistors R3 and R5 form a voltage divider, which brings the base of transistor Q1 from its previous +12 volt level to approximately a +8 volt level. Therefore, transistor Q1 will be turned on and current will flow through resistor R1 (25 ohms), through the emitter and through the collector of transistor Q1.

As a result, transistor Q1 functions as a current source. Approximately, a voltage of +8.5 will appear at the emitter of transistor Q1. Resistor R1, nominally 25 ohms, is trimmed, such that when Q1 is turned on, approximately 120 MA of current will flow through resistor R1, through the emitter and out of the collector of transistor Q1. Approximately one-half of the 120 MA of current will flow out of the transmit driver circuit via the TO lead via transistor Q1. The other one-half of the 120 MA of current will flow through resistor R7 and out via the R lead. The current (60 MA) will be transmitted via the TO lead to transformer 248. Since the impedance of the line is essentially 100 ohm, a 6 volt pulse will be present at the input of transformer 248. The direction of the current flow is from transistor Q1 via the TO lead to transformer 248.

As previously mentioned, when the +DRV lead is not transmitting data, the base of transistor Q1 is at approximately +12 volts. This condition results from a small current flow through resistors R3 and R8 to ground. Therefore, the voltage at the base of transistor Q1 is in actuality approximately +11.2 volts. As a result, a small current flows through the base-emitter junction of transistor Q1 and Q1 is never completely turned off. The base-emitter capacitance of transistor Q1 is nearly charged in this condition and this allows transistor Q1 to turn on rapidly.

Next, if data is transmitted from the switching network via the −DRV lead, the −DRV lead will be pulled to ground by a pulse. As a result, the TO lead, which is ultimately connected to output transformer 288, will be connected to ground on the −DRV lead via diode CR4. Transistor Q1 remains turned off. Current will flow through resistors R4 and R6 and diode CR3. Resistors R4 and R6 form a voltage divider, similar to resistors R3 and R5, as mentioned above.

For data transmission on the −DRV lead, resistor R2 and transistor Q2 form a current source, similar to resistor R1 and Q1, as above. Current is now sourced from Q2 and out via the T1 lead, via transformer 247 to output transformer 228. Resistors R4 and R9 play similar functions to resistor R3 and R8, as mentioned above. Resistors R1, R3, R5 and R8 are analogous in function and value to resistors R2, R4, R6 and R9.

Since the current flow produced by transistors Q1 and Q2 is in opposite directions with respect to transformer 248, the current flow from transmitter Q1 will produce the required negative pulses and the current flow from transistor Q2 will produce the required positive pulses.

Referring to FIG. 4, a schematic diagram of the analog switch of FIG. 2 is shown. The SBY lead is connected to the peripheral processor (CPU). For a logic 0 on the SBY lead, the analog switch and consequentially the transmit driver is enabled to provide active transmission by grounding the output lead XFMS0. For a logic 1 on the SBY lead, the analog switch and the transmit driver are disabled from active transmission and remain in the ready and standby condition.

When the SBY lead is at logic 0, current will flow through resistor R12 and through the base of transistor Q12. As a result, transistor Q12 is turned on. The emitter of transistor Q12 is biased to +12 volts. Also, the collector of transistor Q12 will be at approximately 12 volts, and this voltage will be supplied to the transmit driver via the VC lead. In addition, current will flow through resistor R11 and turning on transistor Q11 as a result.

Now turning to an examination of the output XFMS0, which enables its associated transmit driver. For XFMS0 to be connected to ground, there must be a path through either Q11 or Q13 to ground. Since transistor Q12 is turned on and the XFMS0 lead is operating above ground potential, current will flow from the collector of transistor Q12, through resistor R14 and to the base of transistor Q13, turning it on. Therefore, current will flow from the XFMS0 lead through the collector-emitter junction of transistor Q13, through diode CR12 to the ground connection of diode CR12. As a result, a low impedance connection is provided to enable output transformer 228 via the XFMS0 lead.

In the situation when transistor Q12 is turned on and the XFMS0 lead is operating below ground potential, current must flow out of the XFMS0 lead. Current will flow out of the collector of transistor Q12, through resistor R11 to the base of transistor Q11, turning on transistor Q11. Current flows from the emitter of transistor Q11, through diode CR11 and out of the XFMS0 lead. Therefore, a low impedance path is provided regardless of whether current flow is outward or inward from the analog switch via the XFMS0 lead, corresponding to negative or positive pulses from the transmit driver.

Now, if the SBY lead is at logic 1, indicating the corresponding transmit driver is to be disabled and act as a ready and standby copy, no current will flow through transistor Q12. Resistors R12 and R13 and a pull-up resistor (not shown) will hold transistor Q12 turned off. With transistor Q12 turned off, pull-down resistor R15 will place approximately −12 volts on the VC lead. As a result, the −12 volts on the VC lead will disable the corresponding transmit driver.

In addition, a high impedance condition is required on the XFMS0 lead to disable the associated copy of the transmit driver from the digital span, that is, no current flowing via the XFMS0 lead. There must be no low impedance path for current flow in this case.

If a positive voltage is applied to the XFMS0 lead, causing current to attempt to flow into the analog switch, the collector of transistor Q13 will be reversed biased. Therefore, no current can flow through the transistor Q13 junction, since the breakdown voltage of the base-collector junction exceeds the reverse bias applied voltage.

No current can flow via the XFMS0 lead through transistor Q11, since CR11 prevents any current flow in this direction. Therefore, if the XFMS0 lead has a positive voltage, both possible current paths are blocked by diode CR11 and transistor Q13, respectively.

If a negative voltage is applied to the XFMS0 lead, any path for current to flow out of the analog switch via the XFMS0 must be blocked. For current to flow through the base-collector junction of transistor Q13, the current may come from two sources. First, the current may flow via resistor R14 to the base of transistor Q13 or second, current may flow through the emitter-collector junction of transistor Q13. Diode CR12 blocks any current flow through the emitter-collector junction of Q13. For the first case, resistor R14 is approximately 1400 ohms which creates a high impedance path. In addition, transistor Q12 is turned off, so no current may flow through resistor R14 from Q12. Vitually no current can flow through the path of resistors R15 and R14, since resistor R15 is approximately 16000 ohms, a high impedance.

No current can flow through resistor R1 via the emitter-base junction of transistor Q11 because of diode CR11. No current can flow through resistor R11 via the collector-base junction of transistor Q11 because that junction is reversed biased and the breakdown voltage will not be exceeded by the reverse bias. Therefore, there is no low impedance path for current to flow out of transistors Q13 via the XFMS0 lead.

If the negative voltage remains applied to the XFMS0 lead, no current path must also exist through transistor Q11. Since the voltage at the base of transistor Q11 is approximately at −12 volts due to resistor R15, the base-emitter junction of Q11 is reversed biased. Transistor Q11 is turned off and no current flows through the collector-emitter junction or through the base-emitter junction of Q11.

Therefore, if the SBY lead is at logic 1, the XFMS0 lead will always be a high impedance output.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system having a CPU, a transmission circuit arrangement is connected to a digital span and to a switching network of said switching for providing a fault tolerant arrangement for converting unipolar switching network data to bipolar digital span data, said transmission circuit arrangement comprising:

said transmission circuit arrangement including first and second transmission circuit copies;

first and second transformer means connected respectively between said first and second transmission circuit copies and said digital span, said first and second transformer means respectively connected to said first and second transmission circuit copies via first and second output lead;

said switching network connected to said first and second transmission circuit copies via corresponding first and second input leads and being operated to alternately transmit first and second input signals of a first value;

each said transmission circuit copy comprising:

first current control means connected to said first input lead and to said first and second output leads, said first current control means being operated to connect said first input lead to said second output lead and being further operated to permit a predetermined current to flow from said first to said second output lead via said corresponding transformer means;

second current control means connected to said second input lead and to said first and second output leads, said second current control means being operated to connect said second input lead to said first output lead and being further operated to permit a predetermined current to flow from said second to said first output lead via said corresponding transformer means;

voltage control means connected to said CPU, to a voltage source and to said first and second current control means, said voltage control means being operated in response to said CPU to enable said first transmission circuit copy and simultaneously to disable said second transmission circuit copy or alternatively being operated in response to said CPU to disable said first transmission circuit copy and simultaneously to enable said second transmission circuit copy;

impedance control means connected to said CPU, to said corresponding transformer means via a terminal lead and to said voltage control means, said impedance control means operated in response to said CPU to connect a high impedance on said terminal lead to disable said corresponding transmission circuit copy or alternatively being operated in response to said CPU to connect a low impedance to said terminal lead to enable said corresponding transmission circuit copy; and said first and said second current control means of said enabled transmission circuit copy being alternately operated to produce said bipolar data.

2. A transmission circuit arrangement as claimed in claim 1, said first current control means of each transmission circuit copy including a diode having a cathode connected to said second output lead and having an anode connected to said first input lead.

3. A transmission circuit arrangement as claimed in claim 1, said second current control means of each transmission circuit copy including a diode having a cathode connected to said first output lead and having an anode connected to said second input lead.

4. A transmission circuit arrangement as claimed in claim 1, said first current control means of each transmission circuit copy including:

first voltage divider means connected between ground and said voltage source;

first transistor means having a base, an emitter and a collector lead, said base connected to said first voltage divider and said collector connected to said first output lead;

first diode means connected between said first voltage divider means and said second output lead;

first resistor means connected to said emitter lead and to a common connection of said first voltage divider means and said voltage source; and second resistor means connected between ground and said base lead of said first transistor means and being operated to produce a trickle current through said first transistor means.

5. A transmission circuit arrangement as claimed in claim 1, each transmission circuit copy further including third resistor means connected between a center tap lead of said corresponding transformer means and said first output lead.

6. A transmission circuit arrangement as claimed in claim 5, each transmission circuit copy further including an inductive-resistive network connected between said first and second output leads and said center tap lead and said corresponding transformer means, said inductive-resistive network being operated for shaping said bipolar data.

7. A transmission circuit arrangement as claimed in claim 6, each transmission circuit copy further including an equalization and padding network operated to attenuate and to shape said bipolar data.

8. A transmission circuit arrangement as claimed in claim 1, each transmission circuit copy including:

second voltage divider means connected between ground and said voltage source;

second transistor means having a base, an emitter and a collector lead, said base lead connected to said second voltage divider means and said collector lead connected to said second output lead;

second diode means connected between said second voltage divider means and said first output lead;

fourth resistor means connected to said emitter lead of said second transistor means and to a common connection of said second voltage divider means and said voltage source; and fifth resistor means connected between ground and said base lead of said second transistor means and being operated to produce a trickle current through said second transistor means.

9. A transmission circuit arrangement as claimed in claim 1, said first and second current control means of each transmission circuit copy collectively comprising a thick film hybrid.

10. A transmission circuit arrangement as claimed in claim 1, said voltage control means and said impedance control means of each transmission circuit copy collectively comprising a thick film hybrid.

11. A transmission circuit arrangement as claimed in claim 1, said voltage control means of each transmission circuit copy including third transistor means having a base, an emitter and a collector lead, said base lead connected to said CPU, said emitter lead connected to said voltage source and said collector lead connected to said corresponding first and second current control means.

12. A transmission circuit arrangement as claimed in claim 1, said impedance control means of each transmission circuit copy including:

third voltage divider means connected to said voltage control means and to said voltage source;

fourth transistor means having a base, an emitter and a collector lead, said base lead connected to said third voltage divider means and said collector lead connected to said corresponding transformer means;

third diode means having a cathode connected to said emitter lead of said fourth transistor means and an anode connected to ground;

fifth transistor means having a base, an emitter and a collector lead, said base lead connected to said third voltage divider means and said collector lead connected to ground;

fourth diode means having a cathode connected to said emitter lead of said fifth transistor means and an anode connected to said corresponding transformer means.

* * * * *